Feb. 22, 1966     D. L. EVANS     3,236,579
GLARE SHIELD FOR SPECTACLE LENS HAVING VACUUM
CUP ATTACHMENT MEANS
Filed Aug. 17, 1960

INVENTOR.
DAVID L. EVANS
BY
George H. Baldwin
ATTORNEY

United States Patent Office 3,236,579
Patented Feb. 22, 1966

3,236,579
GLARE SHIELD FOR SPECTACLE LENS HAVING VACUUM CUP ATTACHMENT MEANS
David L. Evans, 5506 Nettie Road, Jacksonville 7, Fla.
Filed Aug. 17, 1960, Ser. No. 50,204
3 Claims. (Cl. 351—47)

This invention relates to a glare shield arrangement for spectacles and more particularly to a spectacle glare shield comprising a sheet of selectively transparent material and means for detachably securing the sheet to a spectacle lens.

An object of this invention is to provide an improved glare shield wherein the glare shield is readily attachable to and removable from a spectacle lens, which does not soil or damage the lens, and which may be conveniently handled, stored and packaged without special care.

Another object of the present invention is to provide a glare shield which will appropriately fit a wide variety of differently curved or powered lenses.

The invention particularly contemplates a spectacle glare shield comprising a tinted or selectively transparent sheet element of sufficient stiffness to be self-supporting and vacuum cups attached to the sheet element and which is configured and arranged to afford ready and secure attachment of the sheet element to a spectacle lens, to afford ready removal of the element from the lens, and to retain the sheet element in a particular position with respect to the lens with the lower edge portion of the element in contact against the surface of the lens.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

Figure 3:
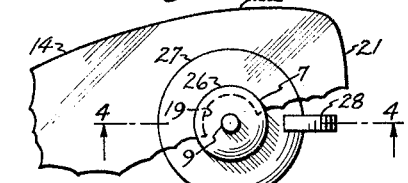
FIG. 3 is a front elevational view on an enlarged scale of a fragmentary corner portion of a selectively transparent sheet and a vacuum cup in accord with the invention.
Figure 4:
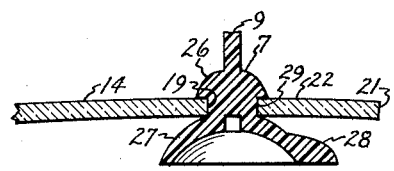
Figure 5:
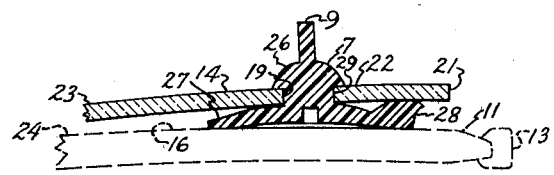

FIG. 4 is a transverse sectional view taken along line 4—4 of FIG. 3 showing the vacuum cup in the position assumed before attachment to a lens and showing a fragment of the selectively transparent sheet; and FIG. 5 is a transverse sectional view similar to FIG. 4 showing the vacuum cup in the position assumed after attachment of the shield arrangement to a lens, the lens being represented in fragment by broken lines.

Figure 1:
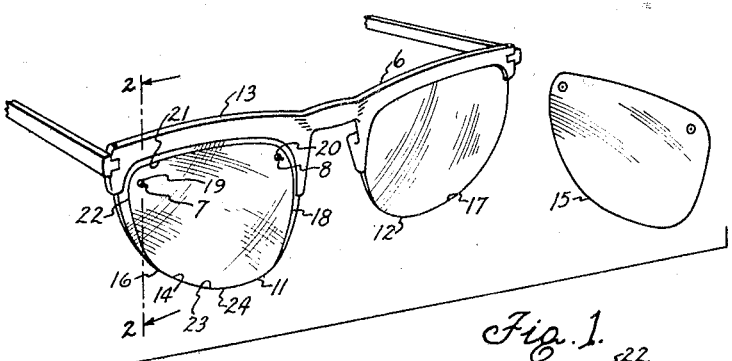
FIG. 1 is an exploded view of a pair of spectacles and a pair of glare shields in accord with the invention, portions of the spectacles being broken away.
Figure 2:
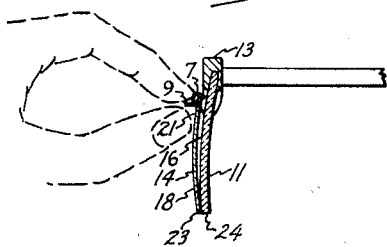
FIG. 2 is a transverse sectional view taken along line 2—2 of FIG. 1 showing a spectacle lens with a glare shield applied thereto.

Referring now more particularly to FIGS. 1 and 2 of the drawings, a conventional pair of spectacles or eyeglasses 6 is shown which includes concavo-convex glass lenses 11 and 12 mounted within a frame 13, a glare shield 14 being attached to the outer convex surface 16 of lens 11 and a second glare shield 15 being shown for use with but detached from the outer convex surface 17 of lens 12.

The glare shield 14 comprises a sheet 18 of selectively transparent material, having openings 19 and 20 in its upper end portion 21, and mounting means for sheet 18 comprising vacuum cups or suction cups 7 and 8 inserted in openings 19 and 20 for attachment to the outer surface 16 of lens 11. The suction cups 7 and 8 are applied to hold sheet 18 in place on the lens 11 by slightly moistening and pressing each respective cup against the lens. The suction cup 7 includes a stem portion 9 which is graspable by the fingertips of a hand, represented by broken lines in FIG. 2, whereby, without touching the lens 11 or sheet 18, the suction cup 7 may be pulled away from lens 11. Suction cup 8 is, of course, identical with cup 7 and is similarly attachable to and removable from lens 11.

In the exploded views of FIGS. 3, 4 and 5 are shown an upper corner portion 22 of a sheet 18 of selectively transparent material and the suction cup 7 mounted thereto. Suction cup 7 is seen to comprise in addition to stem portion 9, a shoulder portion 26 and a cup portion 27, sheet 18 being nested on a neck portion 29 which extends between 26 and cup portion 27. A stabilizer wedge 28 is provided on the cup portion 27, so that sheet 18 at its lower end portion 23 will be forced into engagement with the lower end portion 24 of lens 11, shown in FIG. 2.

As can be seen from FIGS. 3 and 5, the suction cup 7 is positioned to allow the wedge 28 to be generally vertically above opening 19 and toward the upper end 21 of sheet 18 which causes the upper end 21 to be forced outwardly from lens 11, shown by broken lines in FIG. 5, thereby slanting sheet 18 and forcing its lower end 23 inwardly toward lens 11. When the suction cup 7 is pressed downwardly onto lens 11 the stabilizer wedge 28 tilts upwardly into engagement with the upper end portion 21 of the sheet 18. The stabilizer wedge 28 therefore provides an adjustable tilting means whereby the sheet 18 is slanted when attached to lens 11 with the lower end 23 of sheet 18 engaging the lower end portion 24 of lens 11 due to the slanting produced by the wedge.

The specific suction cups 7 and 8 of the present invention are made of elastic type materials, typically soft rubber or synthetic rubber. The suction cup in accord with this invention, in order that there be a minimal amount of interference with the viewing area of the spectacles, has, when the cup portion is not flattened, a height, including the stem, of approximately 0.25 inch; a length of stem outwardly from the shoulder of 0.10 inch; a shoulder 0.13 inch in diameter and 0.05 inch in height; a cup portion having walls about 0.015 inch thick and meeting the neck portion 29 about 0.08 inch outwardly of the lower edge of the cup; a neck length between the shoulder and cup of about 0.03 inch; an outer cup diameter of 0.22 inch and an inner cup diameter of 0.19 inch. The stabilizer wedge projects laterally from the periphery of the cup by about 0.06 inch and has width and height dimensions of 0.04 inch each.

The sheet 18 of glare shield 14 of the present invention is a thin sheet of self supporting transparent material, such as tinted cellulose acetate or celluloid. Other materials are also suitable and among these are sheets containing optically oriented light-polarizing crystals. Such materials, whether tinted or light polarized, selectively interefer with the passage of incident light and are herein included in the term "selectively transparent material."

In practice the selectively transparent sheets, in accordance with this invention, are made to have a smaller radius of curvature than the vast majority of lenses being used in spectacles, so that the sheets, when applied to the lenses, will be contiguous with the lenses at their lower end portions and will not be contiguous with the central portions of the lenses. The sheets, being in contact with the lenses only at their lower end portions, provide filtering of the light or shielding from glare with minimal interference with the clarity of vision or the effectiveness of the spectacle lens.

The glare shields of the present invention are readily attachable to and removable from spectacle lenses, do not soil or damage the lenses when the shields are applied to or removed from the lenses. The shields may be used whenever one desires to use them, and, when the shields are not being used, they require no special care, may be simply carried in one's pocket or handbag, as the case may be, and may be stored, packaged and displayed for sale without special precautions.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A detachable glare shield for a spectacle lens, said shield comprising in combination a sheet of selectively transparent material, said sheet having an upper end portion and a lower end portion and two side edge portions, said upper end portion having a pair of openings therethrough with one each opening being spaced closely adjacent each of said respective side edge portions, a vacuum cup within each said opening in said sheet, each said vacuum cup having a shoulder portion and a cup portion joined by a neck portion, each said neck portion extending through a respective of said openings, each said vacuum cup further including a stabilizer wedge attached thereto positionable between the lens and said sheet adjacent said upper end portion thereof for urging said lower end portion of said sheet into engagement with the lens when each said vacuum cup is attached to the lens.

2. The glare shield as defined in claim 1 further comprising a respective stem portion attached to said shoulder portion of each said respective vacuum cup whereby said sheet may be readily attached to and removed from the lens.

3. In combination, a pair of spectacles having lenses disposed in the front of the eyes of the wearer, a detachable glare shield for each said lens, said shield including a sheet of selectively transparent material generally conforming in shape to the configuration of said lens, said sheet having an upper end portion and a lower end portion and two side edge portions, said upper portion having a pair of openings therethrough spaced downwardly from the upper edge of said sheet, each of said openings being spaced closely adjacent respective said side edge portions and inwardly of the side edges of said sheet, a vacuum cup within each said opening in said sheet, each said vacuum cup having a shoulder portion and a cup portion joined by a neck portion extending through each said opening, said shoulder portion engaging the outer surface of said glare shield, said cup portion being located between said shield and said lens and releasably attached thereto, each said vacuum cup further including a stabilizer wedge attached thereto and located spacedly above each said opening and generally between each said opening and said upper edge of said sheet, each said stabilizer wedge being compressed between said sheet and said lens to forcibly urge said lower portion of said sheet into engagement with said lens.

References Cited by the Examiner

UNITED STATES PATENTS

| | | | |
|---|---|---|---|
| 1,808,208 | 6/1931 | David | 88—93 X |
| 1,883,791 | 10/1932 | Jewell | 248—206 X |
| 2,172,573 | 9/1939 | Blumenthal | 88—41 |
| 2,475,704 | 7/1949 | Gruben. | |
| 2,530,685 | 11/1950 | Davis et al. | 240—46.59 |
| 2,544,378 | 3/1951 | Cyr | 88—113 |
| 2,632,669 | 3/1953 | Piwczynski et al. | 88—1 |
| 2,650,698 | 9/1953 | Castner. | |

FOREIGN PATENTS

| | | |
|---|---|---|
| 316,525 | 7/1929 | Great Britain. |
| 480,600 | 2/1938 | Great Britain. |
| 686,329 | 4/1930 | France. |

JEWELL H. PEDERSEN, *Primary Examiner.*

EMIL S. ANDERSON, FREDERICK M. STRADER,
*Examiners.*